United States Patent Office 2,897,591
Patented Aug. 4, 1959

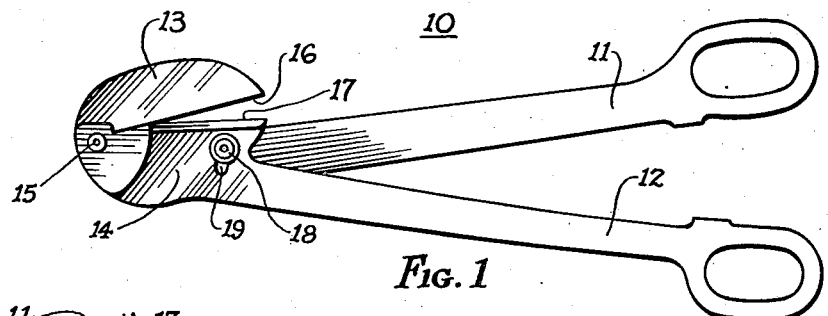
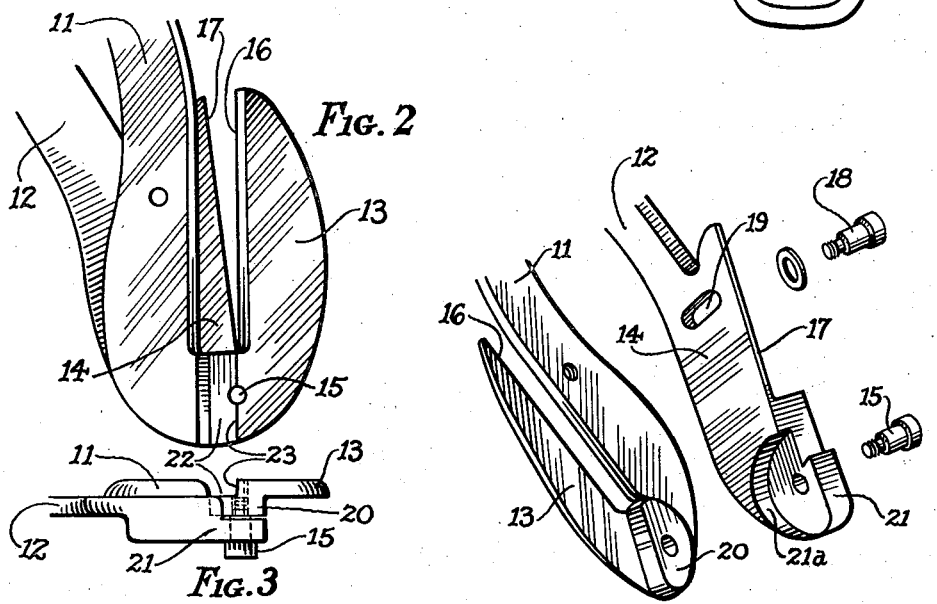
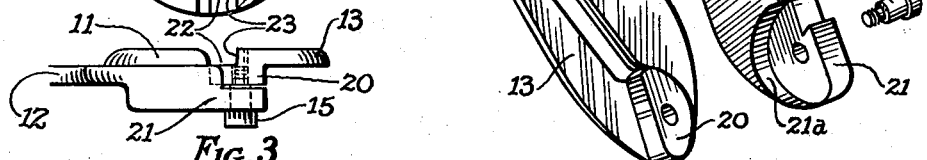
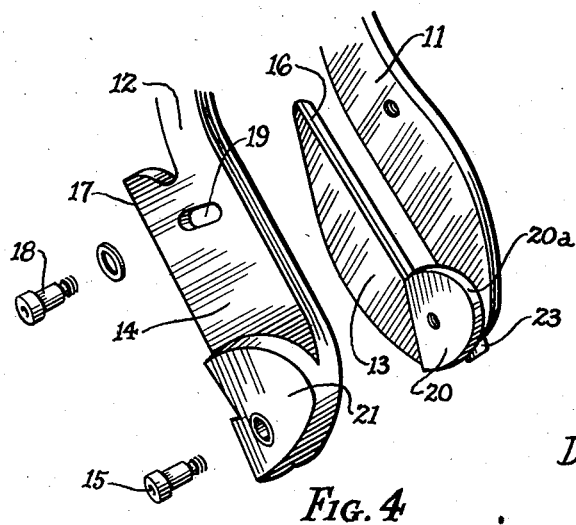

2,897,591

CUTTING SHEARS OF THE PULL TYPE

Salvatore James Nastasi, Cold Spring, and Dominick A. Quattrociocchi, Poughkeepsie, N.Y.

Application November 13, 1958, Serial No. 773,733

6 Claims. (Cl. 30—253)

This invention relates to shears for use in cutting metal and the like, and more particularly to shears having cutting blades or scissor members movable about a pivot member to and from each other by means of handle arms wherein the cutting blades or scissor members extend in the same direction from the pivot member as the handle arms, that is, shears of the pull type.

Metal cutting shears heretofore known in which the cutting blades are arranged in line with their respective handle arms have an inherent cutting action which tends to bend or curl the material being cut.

The improved shear according to this invention has a pivot in line with the working edges of the cutting blades in the usual manner in order to obtain a maximum leverage transfer from the handle arms to the cutting blades. However, in order to overcome the above noted undesirable feature, the pivot is arranged in cooperating bearing portions each offset laterally along the axis of the pivot with an outside face of one of the bearing portions adapted to support the material being cut, thus restricting the bending action.

It is an object of this invention to provide an improved shear of the pull type having a pivot arranged in line longitudinally with the working edge of each of the cutting blades and with the bearing for the pivot for each of the cutting blades offset laterally from the working edge of the cutting blades.

It is a further object of this invention to provide an improved shear of the pull type wherein an outside face of one of the offset bearing portions forms a supporting surface for the material being cut and restricts the bending thereof.

It is a further object to provide a shear of this kind which is practical, reliable and durable, and handier in use than prior known shears for the same purpose.

These and other objects are accomplished by means of a particular arrangement of parts which is fully shown and described in the following description with reference to the accompanying drawing, in which:

Figure 1 is a side elevational view of the shears shown in a partially open position;

Figure 2 is an enlarged fragmentary side elevational view of the shears, taken from the opposite side of Figure 1, shown in a partially open position;

Figure 3 is a front end view of the shears as shown in Figure 2;

Figure 4 is an enlarged fragmentary exploded view of the shears rotated 180° to the left from the position shown in Figure 1; and Figure 5 is a similar view, taken from the opposite side of Figure 1, with the scissor members spread apart to show in detail the cooperating cam portions forming the load bearing pivot means of the shears.

In the drawing, like characters of reference indicate corresponding parts of each figure.

The shears, generally denoted at 10, are comprised of two elements, each including handle members or arms 11 and 12 with cutting blades 13 and 14, respectively, formed integral therewith. The handle arms and their associated cutting blades are secured together by means of a shouldered pivot bolt 15 passing therethrough and in line with the working edges 16 and 17 of the blades 13 and 14, respectively. As shown in Figures 1, 4 and 5, the arcuate movement of the handle members 11 and 12 (and, accordingly, the arcuate movement of the cutting blades 13 and 14, respectively, formed as an integral part thereof) about the pivot 15 is limited by a shouldered bolt 18 secured in handle member 11 and which passes through and cooperates with a slot 19 in cutting blade 14. This bolt also serves to retain the ends of the cutting blades remote from the pivot 15 in alignment and prevents any relative spreading action between the working edges 16 and 17 along their full length.

Referring particularly to Figure 5, it will be seen that both of the handles 11 and 12 and the cutting blades 13 and 14, respectively, carried thereby are in substantially the same plane and are co-linear. The pivot 15 about which the handles and their respective cutting blades rotate is arranged within a boss or bearing portions 20 and 21 intermediate each of the handles 11 and 12, respectively, and their associated cutting blades 13 and 14, respectively. The bearing portions 20 and 21 are offset laterally in the same direction from the longitudinal axis of each handle and associated cutting blade along the central axis of pivot 15. In the drawing Figure 4, the offset is to the left and, in Figure 5 taken from the opposite side, the offset is shown as being to the right. In order to give added strength to the pivot 15, the offset bearing portion 20 may be formed as a circular cam section 20a adapted to cooperate with a similar recessed cam section 21a formed in the inside face of offset bearing portion 21 as shown in Figure 5.

As shown in Figures 2 and 3, and to some degree in Figure 4, the outside face of bearing portion 20 between handle 11 and its associated cutting blade 13 forms a recessed area 22 exactly in line longitudinally with the working edges 16 and 17 of the shear. In addition, the side 23 of the recess is formed normal to the adjacent faces of the cutting blades and in the plane of the common pivot axis of the elements, thus serving as a support for the material which has been cut as it passes therethrough and restricts the normal bending action thereof.

While we have shown a preferred embodiment of our invention, it will be apparent that variations and modifications thereof may be made without departing from the underlying principles and objects within the spirit and scope of the appended claims.

We claim:

1. Cutting shears of the pull type comprising, in combination, two movable elements hinged together for rotary movement about a common pivot axis at the same end thereof, each of said elements defining a handle arm and a cutting blade extending in the same direction from the pivot axis thereof, the handle arm and cutting blade of one element opposing the handle arm and cutting blade of the other element, a working edge formed on the opposing face of each of the cutting blades, the said working edges being in line longitudinally with the common pivot axis when the blades are in a closed position, and a pivot bolt arranged through an offset bearing portion formed as a part of each element adjacent the common pivot axis thereof.

2. Cutting shears of the pull type comprising, in combination, two movable elements hinged together for rotary movement about a common pivot axis at the same end thereof, each of said elements defining a handle arm and a cutting blade extending in the same direction from the pivot axis thereof, the handle arm and cutting blade of one element opposing the handle arm and cutting blade of the other element, a pivot bearing portion formed in each element adjacent the pivot axis thereof, said bearing portion of each element being offset in the same direction along the pivot axis thereof, a working edge formed on the opposing face of each of the cutting blades, said common pivot axis being in line longitudinally with the cutting blade working edges when the blades are in a closed position, and a pivot bolt arranged through the pivot bearing portion of each element adjacent the common pivot axis thereof.

3. Cutting shears of the pull type comprising, in combination, two movable elements hinged together for rotary movement about a common pivot axis at the same end thereof, each of said elements defining a handle arm and a cutting blade extending in the same direction from the pivot axis thereof, the handle arm and cutting blade of one element opposing the handle arm and cutting blade of the other element, a pivot bearing portion formed in each element adjacent the pivot axis thereof, said bearing portion of each element being offset laterally from the longitudinal axis thereof in the same direction along the pivot axis thereof, a working edge formed on the opposing face of each of the cutting blades, said common pivot axis being in line longitudinally with the cutting blade working edges when the blades are in a closed position, and a pivot bolt arranged through the pivot bearing portion of each element adjacent the common pivot axis thereof.

4. Cutting shears of the pull type according to claim 3, in which the outer periphery of the offset bearing portion of one element defines a cam surface having its rotational axis along the common pivot axis of the elements, and the offset bearing portion of the other element includes a recess defining a cam surface having its rotational axis along the pivot axis of the other element and cooperating with the first mentioned cam surface, the pivot bolt passing through said cams at the common rotational axes thereof and in line with but offset from the common pivot axis of the elements.

5. Cutting shears of the pull type according to claim 4, in which the outside face of the offset bearing portion of the said one element defines a longitudinal recess in line with the working edges of the cutting blades when the same are closed, one face of the recess being normal to the adjacent faces of the blades and in the plane of the common pivot axis of the elements.

6. Cutting shears of the pull type according to claim 4, in which the combination includes a shouldered bolt secured in the handle arm of the said one element adjacent the end of the cutting blade formed integral therewith remote from the pivot axis thereof, the bolt having a shank length substantially equal to the thickness of the cutting blade of said other element, and a slot defined in the cutting blade of the said other element radially equidistant with the bolt from the common pivot axis of the said elements, the bolt shank passing through said slot and coacting therewith to limit the rotary movement of the said elements about their common pivot axis and the shoulder of the bolt coacting with the outside face of the cutting blade of the said other element to prevent relative spreading between the working edges of the said cutting blades along their full length.

No references cited.